(12) United States Patent
Knerr et al.

(10) Patent No.: US 10,796,814 B2
(45) Date of Patent: Oct. 6, 2020

(54) INSULATED WINDING WIRE WITH CONFORMAL COATINGS

(71) Applicant: Essex Group, Inc., Atlanta, GA (US)

(72) Inventors: Allan R. Knerr, Fort Wayne, IN (US); David Marshall Cain, Easley, SC (US)

(73) Assignee: Essex Group LLC, Atlanta, GA (US)

( * ) Notice: Subject to any disclaimer, the term of this patent is extended or adjusted under 35 U.S.C. 154(b) by 285 days.

(21) Appl. No.: 16/079,574

(22) PCT Filed: Mar. 30, 2017

(86) PCT No.: PCT/US2017/025023
§ 371 (c)(1),
(2) Date: Aug. 24, 2018

(87) PCT Pub. No.: WO2017/173081
PCT Pub. Date: Oct. 5, 2017

(65) Prior Publication Data
US 2019/0068020 A1    Feb. 28, 2019

Related U.S. Application Data

(60) Provisional application No. 62/315,874, filed on Mar. 31, 2016.

(51) Int. Cl.
| | |
|---|---|
| *H01B 3/18* | (2006.01) |
| *H01B 13/14* | (2006.01) |
| *H02K 3/04* | (2006.01) |
| *H02K 3/12* | (2006.01) |

(Continued)

(52) U.S. Cl.
CPC .............. *H01B 3/18* (2013.01); *H01B 3/307* (2013.01); *H01B 13/14* (2013.01); *H02K 3/04* (2013.01);
(Continued)

(58) Field of Classification Search
CPC .......... H01B 3/18; H01B 3/307; H01B 13/14; H01B 3/306; H01B 3/427; H02K 3/04;
(Continued)

(56) References Cited

U.S. PATENT DOCUMENTS 3,819,973 A * 6/1974 Hosford .................. H05B 33/00
                                                             313/498
4,447,947 A     5/1984 McCarty
(Continued)

FOREIGN PATENT DOCUMENTS

WO     2014095405 A3    6/2014

OTHER PUBLICATIONS

Notice of Allowance, dated Mar. 14, 2019, for U.S. Appl. No. 16/079,570.
(Continued)

*Primary Examiner* — Timothy J Thompson
*Assistant Examiner* — Michael F McAllister (57) ABSTRACT

Insulated winding wires, winding wire articles, and associated formation methods are described. An insulated winding wire may include a conductor and insulation formed around the conductor. In certain embodiments, the insulation may include a first layer including a first parylene material and a second layer including a second parylene material different from the first parylene material. In other embodiments, the insulation may include one or more layers containing parylene formed over base insulation.

22 Claims, 6 Drawing Sheets

(51) Int. Cl.
  *H02K 3/28* (2006.01)
  *H02K 3/32* (2006.01)
  *H02K 3/40* (2006.01)
  *H02K 15/12* (2006.01)
  *H01B 3/30* (2006.01)
  *H02K 3/34* (2006.01)
  *H02K 15/10* (2006.01)
  *H02K 3/30* (2006.01)
  *H01B 3/42* (2006.01)

(52) U.S. Cl.
  CPC .............. *H02K 3/12* (2013.01); *H02K 3/28* (2013.01); *H02K 3/30* (2013.01); *H02K 3/32* (2013.01); *H02K 3/345* (2013.01); *H02K 3/40* (2013.01); *H02K 15/105* (2013.01); *H02K 15/12* (2013.01); *H01B 3/306* (2013.01); *H01B 3/427* (2013.01)

(58) Field of Classification Search
  CPC .. H02K 3/12; H02K 3/28; H02K 3/30; H02K 3/32; H02K 3/345; H02K 3/40; H02K 15/105; H02K 15/12
  USPC ...................................... 174/120 R
  See application file for complete search history.

(56) References Cited

U.S. PATENT DOCUMENTS

| | | |
|---|---|---|
| 4,816,618 A | 3/1989 | Bongianni |
| 6,642,827 B1 | 11/2003 | McWilliams et al. |
| 9,324,476 B2 * | 4/2016 | Caudill ............. H01B 3/427 |
| 2004/0207284 A1 | 10/2004 | Neet |
| 2008/0128154 A1* | 6/2008 | Faust .................. H01B 3/30 174/120 R |
| 2008/0262611 A1 | 10/2008 | Li et al. |
| 2010/0060098 A1 | 3/2010 | Inderka et al. |
| 2010/0321664 A1 | 12/2010 | Makarovic et al. |
| 2011/0151111 A1 | 6/2011 | Lawrence et al. |
| 2012/0119609 A1 | 5/2012 | Janecek |
| 2013/0032377 A1* | 2/2013 | Morishita ........... H01B 13/14 174/120 SR |
| 2013/0037304 A1* | 2/2013 | Ikeda .................. H01B 3/30 174/119 C |
| 2014/0159536 A1* | 6/2014 | Flett .................. H02K 15/08 310/184 |
| 2014/0318825 A1* | 10/2014 | Erb .................. G02B 6/3817 174/78 |
| 2015/0021412 A1* | 1/2015 | Gilpatrick ............ B05B 7/2464 239/310 |
| 2015/0221412 A1 | 8/2015 | Caudill et al. |
| 2016/0213898 A1* | 7/2016 | Leung ................. A61M 27/002 |
| 2017/0056631 A1* | 3/2017 | Leung ................. A61L 31/10 |

OTHER PUBLICATIONS

Supplementary European Search Report for EP 17776650, dated Oct. 18, 2019.

Notice of Allowance, dated Sep. 4, 2019, for U.S. Appl. No. 16/409,121.

* cited by examiner

INSULATED WINDING WIRE WITH CONFORMAL COATINGS

CROSS-REFERENCE TO RELATED APPLICATION

This application is a 371 of PCT/US17/25023, file on Mar. 30, 2017 and entitled "Insulated Winding Wire With Conformal Coatings," which claims priority to U.S. Provisional Application No. 62/315,874, filed Mar. 31, 2016 and entitled "Insulated Winding Wire With a Conformal Coating." The contents of each application is incorporated by reference herein in its entirety.

TECHNICAL FIELD

Embodiments of the disclosure relate generally to insulated winding wire and, more particularly, to winding wire incorporating one or more conformal coating layers.

BACKGROUND

Magnetic winding wire, also referred to as magnet wire, is used in a multitude of devices that require the development of electrical and/or magnetic fields to perform electromechanical work. Examples of such devices include electric motors, generators, transformers, actuator coils, etc. Typically, magnet wire is constructed by applying electrical insulation to a metallic conductor, such as a copper, aluminum, or alloy conductor. The electrical insulation is typically formed as a coating that provides for electrical integrity and prevents shorts in the magnet wire. Conventional insulations include polymeric enamel films, extruded thermoplastic layers, polymeric tapes, and certain combinations thereof.

The insulation system of a magnet wire can be damaged by a wide variety of different types of events during manufacture, transport, and/or subsequent processing. Additionally, certain sizes of magnet wire, such as wire larger than 15 AWG, tend to be stiff and can be more easily damaged during manufacture and/or processing. Even minor damage to the insulation, such as a pinhole in one or more layers of insulation, may result in a fault site that reduces the performance of the wire. Partial discharge can occur at a localized fault site and typically begins within voids, cracks, or inclusions within a solid dielectric; however, it can also occur along surfaces of an insulation material. Once begun, partial discharge progressively deteriorates an insulation material and ultimately leads to electrical breakdown.

Additionally, when magnet wire is formed into shaped articles or incorporated into an assembly, such as an electric motor, starter-generator, etc., the wire is often bent and/or twisted. This manipulation may result in the generation of fault sites within the magnet wire. The risk of fault site formation may be increased with larger sizes of magnet wire that tend to be relatively stiffer. Moreover, in certain applications, magnet wire may be cut into sections, and each section may be worked or formed into a desirable shape for insertion into an assembly. For example, sections of magnet wire may be formed into hairpins that are incorporated into a motor assembly. When cut, the underlying conductor is exposed, thereby subjecting the wire to an increased risk of fault sites developing. Accordingly, there is an opportunity for improved winding wires or magnet wires incorporating conformal coatings that provide additional dielectric protection for imperfections, fault sites, and/or exposed conductor portions.

Further, recent developments in certain applications have led to a demand for magnet wire designs with improved electrical properties, such as increased dielectric strength and/or increased partial discharge inception voltage ("PDIV"). The dielectric strength of a material generally refers to the maximum applied electric field that the material can withstand without breaking down. The PDIV generally refers to the voltage at which electrical discharges that do not completely bridge the insulation between electrodes or conductors start to occur. There is also an increased demand for magnet wire to function in higher temperature applications and/or environments. For certain applications, such as vehicle applications, it may also be desirable for magnet wire to be resistant to hydrocarbon oil, other chemicals, and/or moisture. For example, in some motor applications, magnet wire is at least partially submerged in transmission fluid. This transmission fluid can break down traditional magnet wire insulation materials, such as enamel insulations.

Additionally, in many applications, it is desirable to limit or minimize overall insulation thickness in order to permit a higher amount of magnet wire to be packed or formed into an electrical device coil or formed into a greater number of components for incorporation into an assembly. The performance of an electrical device is strongly correlated to an amount of magnet wire that can be placed into an available core slot area. Reducing the thickness of magnet wire insulation may permit higher power output and/or increased performance. Accordingly, there is an opportunity for improved magnet wire having desired electrical properties with limited increases or even decreases to overall insulation thickness.

BRIEF DESCRIPTION OF THE DRAWINGS

The detailed description is set forth with reference to the accompanying figures. In the figures, the loft-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to insulated winding wires, magnetic winding wires, and/or magnet wires (hereinafter referred to as "magnet wire") that include conformal coatings. Other embodiments are directed to various magnet wire articles and/or assemblies that include conformal coatings. Conformal coatings, such as a coating that contains parylene, may assist in eliminating pinhole defects in magnet wire. For example, defects in underlying insulation (i.e., an underlying enamel layer, etc.) may be covered by one or more conformal layers thereby reducing the likelihood of insulation breakdown. In certain embodiments, conformal coating(s) may also provide improved electrical properties relative to conventional magnet wire insulation. For example, a parylene coating may provide for insulation with a relatively higher breakdown voltage or dielectric strength, a relatively higher partial discharge electrical voltage ("PDIV"), and/or improved high temperature resistance. Certain conformal coatings, such as parylene coatings, may also provide insulation having a lower dielectric constant, improved lubricity, and/or reduced moisture absorption relative to convention magnet wire insulation.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
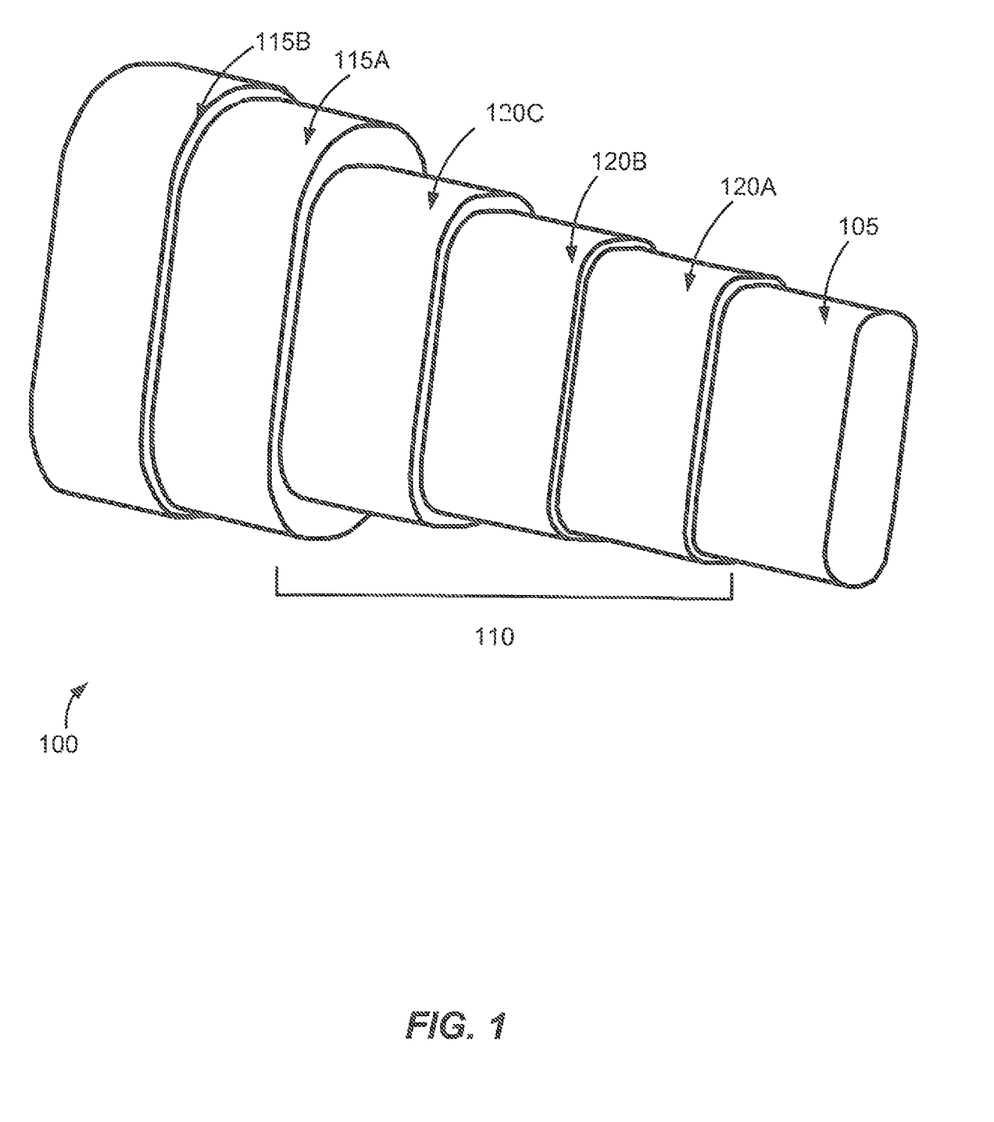
FIG. 1 is a perspective view of an example magnet wire that includes at least one or more conformal layers, according to an illustrative embodiment of the disclosure.

With reference to FIG. 1, a perspective view of an example magnet wire 100 is illustrated in accordance with an embodiment of the disclosure. The magnet wire 100 may include a central conductor 105, any number of base layers of insulation 110 formed around the central conductor 105, and one or more conformal layers 115A, 115B, such as one or more parylene-containing layers, formed as top coats or outermost layers. As desired, the base insulation 110 may include any number of sublayers, such as the three sublayers 120A-C illustrated in FIG. 1. Each of the layers or components of the magnet wire will now be described in greater detail.

The conductor 105 may be formed from a wide variety of suitable materials or combinations of materials. For example, the conductor 105 may be formed from copper, aluminum, annealed copper, oxygen-free copper, silver-plated copper, nickel plated copper, copper clad aluminum ("CCA"), silver, gold, a conductive alloy, a bimetal, or any other suitable electrically conductive material. Additionally, the conductor 105 may be formed with any suitable dimensions and/or cross-sectional shapes. As shown, the conductor 105 may have an approximately rectangular cross-sectional shape. However, as explained in greater detail below with reference to FIGS. 3A-3F, the conductor 105 may be formed with a wide variety of other cross-sectional shapes, such as a rectangular shape (i.e., a rectangle with sharp rather than rounded corners), a square shape, an approximately square shape, a circular shape, an elliptical or oval shape, etc. Additionally, as desired, the conductor 105 may have corners that are rounded, sharp, smoothed, curved, angled, truncated, or otherwise formed.

In addition, the conductor 105 may be formed with any suitable dimensions. For example, a rectangular conductor may have longer sides between approximately 0.020 inches (508 μm) and approximately 0.750 inches (19050 μm) and the shorter sides between approximately 0.020 inches (508 μm) and approximately 0.400 inches (10160 μm). An example square conductor may have sides between approximately 0.020 inches (508 μm) and approximately 0.500 inches (12700 μm). An example round conductor may have a diameter between approximately 0.010 inches (254 μm) and approximately 0.500 inches (12700 μm). Other suitable dimensions may be utilized as desired, and the described dimensions are provided by way of example only. Additionally, in certain embodiments, the conductor 105 may have a cross-sectional area larger than approximately 18 AWG or its equivalent for non-round conductors. Accordingly, a round conductor may have a diameter greater than or equal to approximately 0.0403 inches or approximately 1.024 mm (1024 μm) and/or a cross-sectional area greater than or equal to approximately 1.62 kcmil or approximately 0.823 mm$^2$. Conductors with other cross-sectional shapes (e.g., rectangular conductors, etc.) may include cross-sectional areas greater than or equal to approximately 1.62 kcmil or approximately 0.823 mm$^2$. The dimensions of these conductors (e.g., length, width, etc.) may be sized to provide a desirable cross-sectional area.

A wide variety of suitable methods and/or techniques may be utilized to form, produce, or otherwise provide a conductor 105. In certain embodiments, a conductor 105 may be formed by drawing an input material (e.g., a larger conductor, rod stock, etc.) with one or more dies in order to reduce the size of the input material to desired dimensions. As desired, one or more flatteners and/or rollers may be used to modify the cross-sectional shape of the input material before and/or after drawing the input material through any of the dies. In certain embodiments, the conductor 105 may be formed in tandem with the application of a portion or all of the insulation system. In other words, conductor formation and application of insulation material may be conducted in tandem. In other embodiments, a conductor 105 with desired dimensions may be preformed or obtained from an external source. Insulation material may then be applied or otherwise formed on the conductor 105.

Figure 2A:
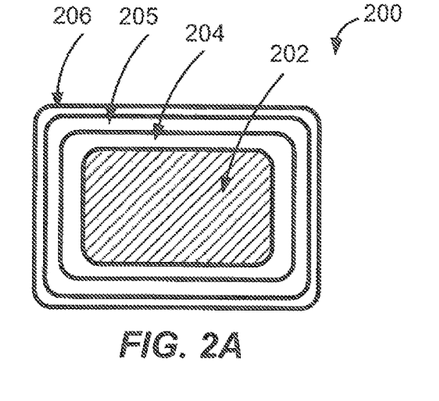
FIGS. 2A-2E are cross-sectional views of example magnet wire constructions that include one or more conformal layers, according to illustrative embodiments of the disclosure.

FIG. 1 illustrates a magnet wire 100 that includes base insulation 110 formed around a conductor 105 prior to the application of one or more layers 115A, 115B containing parylene. In other embodiments, one or more layers containing parylene may be formed directly around a conductor. FIG. 2A illustrates an example magnet wire 200 in which one or more layers containing parylene are formed around a conductor 202 without any base insulation. For example, a first layer 204 containing a first parylene material is formed around the conductor 202. A second layer 206 containing a second parylene material different than the first parylene material is then formed around the first layer 204. An optional layer 205, such as an adhesive layer, may be positioned between the two layers 204, 206 containing parylene. Similarly, an adhesive layer may optionally be positioned between the conductor 202 and the first layer 204. Any number of suitable layers containing parylene may be formed as desired.

In embodiments that include base insulation 110, the base insulation 110 may include one or more suitable layers of insulating, dielectric, and/or semi-conductive materials. In the event that the base insulation 110 includes a plurality of sublayers, any number of sublayers may be utilized. In certain embodiments, the sublayers may be formed from the same materials or combinations of materials. For example, sublayers may be formed as a plurality of enamel layers, and each enamel layer may be formed from the same polymeric material. In other embodiments, at least two of the sublayers may be formed from different materials. For example, different enamel layers may be formed from different polymeric materials. As another example, one or more sublayers may be formed from enamel while another sublayer is formed from an extruded thermoplastic material. A few example magnet wires with different base insulation configurations are illustrated in FIGS. 2B-2E and discussed below.

Figure 2B:
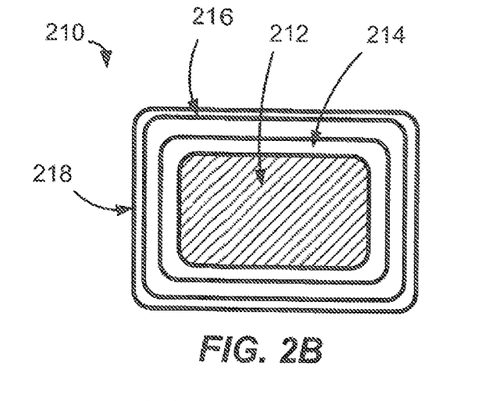

In certain embodiments, the base insulation 110 may include one or more layers of enamel. For example, FIG. 2B illustrates an example magnet wire 210 in which enamel 214 is used as base insulation formed on a conductor 212, and then one or more layers 216, 218 containing parylene are formed over the enamel 214. An enamel layer is typically formed by applying a polymeric varnish to the conductor 105 and then baking the conductor 105 in a suitable enameling oven or furnace. As desired, a plurality of layers of enamel may be applied to the conductor 105 in order to achieve a desired enamel thickness or build. Additionally, each layer of enamel and/or a total enamel build may have any desired thickness, such as a thickness of approximately 0.001, 0.002, 0.003, 0.004, 0.005, 0.006, 0.007, 0.008, 0.009, 0.010 inches, thicknesses included in a range between any two of the aforementioned values, and/or thickness included in a range bounded on either a minimum or maximum end by one of the aforementioned values.

A wide variety of different types of polymeric materials may be utilized as desired to form an enamel layer. Examples of suitable materials include, but are not limited to, polyimide, polyamideimide, amideimide, polyester, polyesterimide, polysulfone, polyphenylenesulfone, polysulfide, polyphenylenesulfide, polyetherimide, polyamide, etc. In certain embodiments, enamel materials having relatively low dielectric constants "ε", such as dielectric constants below approximately 3.5 at approximately 25° C., may be utilized in order to improve electrical performance. As desired, enamel materials may be selected to have a suitable National Electrical Manufacturers Association ("NEMA") thermal class or rating, such as a rating of A, B, F, H, N, R, S, or higher. Higher temperature enamel materials may having a NEMA thermal class rating of R, S, or higher. Additionally, in certain embodiments, an enamel layer may be formed as a mixture of two or more materials. Further, in certain embodiments, different enamel layers may be formed from the same material(s) or from different materials. For example, a first enamel layer may be formed from a polyimide material and a second enamel layer may be formed from a polyamideimide material.

In certain embodiments, one or more suitable filler materials and/or additives may be incorporated into an enamel layer. Examples of suitable filler materials include, but are not limited to, inorganic materials such as metals, transition metals, lanthanides, actinides, metal oxides, and/or hydrated oxides of suitable materials such as aluminum, tin, boron, germanium, gallium, lead, silicon, titanium, zinc, yttrium, vanadium, zirconium, nickel, etc.; suitable organic materials such as polyaniline, polyacetylene, polyphenylene, polypyrrole, other electrically conductive particles; and/or any suitable combination of materials. The filler material(s) may enhance the corona resistance of the enamel and/or the overall insulation system. In certain embodiments, the filler material(s) may also enhance one or more thermal properties of the enamel and/or overall insulation system, such as temperature resistance, cut-through resistance, and/or heat shock. The particles of a filler material may have any suitable dimensions, such as any suitable diameters. In certain embodiments, a filler material may include nanoparticles. Further, any suitable blend or mixture ratio between filler material and enamel base material may be utilized.

In certain embodiments, the base insulation 110 may include one or more suitable wraps or tapes, such as a polymeric tape. As desired, additional materials or additives may be incorporated into, embedded into, or adhered to a tape. A tape may include a wide variety of suitable dimensions, such as any suitable thickness and/or width. Additionally, a tape may be wrapped around the conductor 105 at an angle along a longitudinal direction or length of the conductor.

Figure 2C:
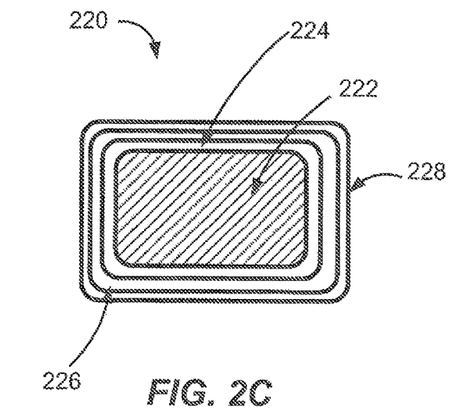
Figure 2D:
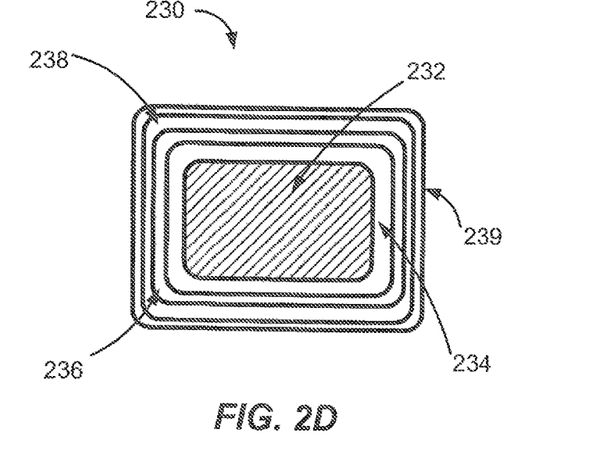

In other embodiments, the base insulation 110 may include one or more layers of extruded material. As desired, extruded layer(s) may be formed directly on the conductor 105 or, alternatively, over one or more underlying layers (e.g., one or more enamel layers). FIG. 2C illustrates an example magnet wire 220 in which an extruded layer 224 is formed on a conductor 222, and then one or more layers 226, 228 containing parylene are formed over the extruded layer 224. FIG. 2D illustrates an example magnet wire 230 in which one or more enamel layers 234 are formed around a conductor 232, and then one or more extruded layers 236 are formed around the enamel layer(s) 234. One or more layers 238, 239 containing parylene may then be formed around the extruded layer(s) 236.

In certain embodiments, an extruded layer may be formed from a suitable thermoplastic resin. A wide variety of suitable materials may be incorporated into a resin or into a plurality of resins that are utilized to form extruded layers. Examples of suitable materials include, but are not limited to, polyether-ether-ketone ("PEEK"), polyaryletherketone ("PAEK"), polyetheretherketoneketone ("PEEKK"), polyetherketoneketone ("PEKK"), polyetherketone ("PEK"), polyetherketoneketoneetherketone ("PEKKEK"), polyketone ("PK"), any other suitable material that includes at least one ketone group, thermoplastic polyimide ("PI"), aromatic polyamide, aromatic polyester, polyphenylene sulfide ("PPS"), materials that combine one or more fluoropolymers with base materials (e.g., materials that include at least one ketone group, etc.), any suitable thermoplastic material, etc. In certain embodiments, a single extruded layer may be formed. In other embodiments, a plurality of extruded layers may be formed. If a plurality of layers is utilized, the extruded layers may be formed from the same material or, alternatively, at least two layers may be formed from different materials.

An extruded layer may be formed with any suitable thickness as desired in various embodiments. For example, an extruded layer may be formed with a thickness of approximately 0.001, 0.002, 0.003, 0.004, 0.005, 0.006, 0.007, 0.008, 0.009, 0.010, 0.012, 0.015, 0.017, 0.020, 0.022, or 0.024 inches, a thickness included in a range between any two of the aforementioned values, or a thickness included in a range bounded on either a minimum or maximum end by one of the aforementioned values. In certain embodiments, an extruded layer may be formed directly on the conductor 105 or an underlying layer (e.g., an enamel layer, etc.). For example, the temperature of the magnet wire 100 may be controlled prior to the application of an extruded layer to eliminate the need for an adhesive layer. In other embodiments, one or more suitable bonding agents, adhesion promoters, or adhesive layers may be incorporated between the extruded layer and an underlying component or layer. Additionally, in certain embodiments, the extruded layer 115 may be formed to have a cross-sectional shape similar to that of the underlying conductor 105 and/or any underlying insulation layers. In other embodiments, an extruded layer may be formed with a cross-sectional shape that varies from that of the underlying conductor 105. As one non-limiting example, the conductor 105 may be formed with an elliptical cross-sectional shape while an extruded layer is formed with an approximately rectangular cross-sectional shape.

Figure 2E:
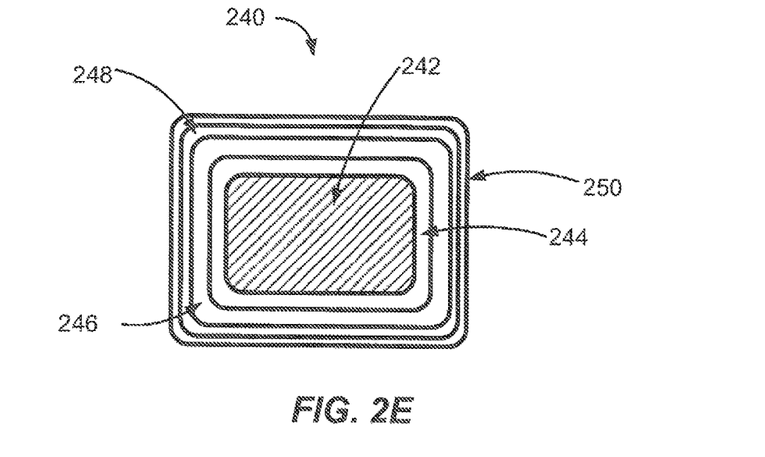

In certain embodiments, one or more semi-conductive layers may be incorporated into the magnet wire 100. For example, one or more semi-conductive layers may be formed on the conductor 105 and or incorporated into the base insulation 110. As yet another example, one or more semi-conductive layers may be formed on top of the base insulation 110. FIG. 2E illustrates an example magnet wire 240 in which a semi-conductive layer 244 is formed around a conductor 242. Base insulation 246 (e.g., one or more enamel layers, one or more extruded layers, etc.) is formed on the semi-conductive layer 244, and one or more layers 248, 250 containing parylene are formed on the base insulation 246.

A semi-conductive layer may have a conductivity between that of a conductor and that of an insulator. Typically, a semi-conductive layer has a volume conductivity ($\sigma$) between approximately $10^{-8}$ Siemens per centimeter (S/cm) and approximately $10^3$ S/cm at approximately 20 degrees Celsius (° C.). A semi-conductive layer may be formed from a wide variety of suitable materials and/or combinations of materials. For example, one or more suitable semi-conductive enamels, extruded semi-conductive materials, semi-conductive tapes, and/or semi-conductive wraps may be utilized. In certain embodiments, a semi-conductive layer may be formed from a material that combines one or more suitable filler materials with one or more base materials. For example, semi-conductive and/or conductive filler material may be combined with one or more base materials. Examples of suitable filler materials include, but are not limited to, suitable inorganic materials such as metallic materials and/or metal oxides (e.g., zinc, copper, aluminum, nickel, tin oxide, chromium, potassium titanate, etc.), and/or carbon black; suitable organic materials such as polyaniline, polyacetylene, polyphenylene, polypyrrole, other electrically conductive particles; and/or any suitable combination of materials. The particles of the filler material may have any suitable dimensions, such as any suitable diameters. In certain embodiments, the filler material may include nanoparticles. Examples of suitable base materials may include, but are not limited to, polyimide, polyamideimide, amideimide, polyester, polyesterimide, polysulfone, polyphenylenesulfone, polysulfide, polyphenylenesulfide, polyetherimide, polyamide, or any other suitably stable high temperature thermoplastic or other material. Further, any suitable blend or mixture ratio between filler material and base material may be utilized.

Additionally, a semi-conductive layer may have any suitable thickness. For example, one or more semi-conductive layers may have thicknesses similar to those discussed above for enamel layers. In certain embodiments, one or more semi-conductive layers may be formed in a similar manner as an enamel layer. For example, a varnish including semi-conductive material may be applied, and the varnish may be heated by one or more suitable heating devices, such as an enameling oven. In other embodiments, one or more semi-conductive layers may be extruded. As a result of incorporating one or more semi-conductive layers into the magnet wire 100, non-uniform electric, magnetic, and/or electromagnetic fields (hereinafter collectively referred to as electric fields) may be equalized or "smoothed out", thereby reducing local stress in the insulation and improving electrical performance. In other words, one or more semi-conductive layers may assist in equalizing voltage stresses in the insulation and/or dissipating corona discharges at or near the conductor 105 and/or at or near a surface of the magnet wire 100.

As desired in various embodiments, any combination of layers and/or materials may be utilized to form the base insulation 110. For example, the base insulation 110 may include any suitable combination of enamel, extruded, tape, semi-conductive, and/or other layers. Additionally, the base insulation 110 (and/or any sublayers) may be formed with any desired concentricity, which is the ratio of the thickness of a layer to the thinness of the layer at any given cross-sectional along a longitudinal length of the magnet wire 100. In certain embodiments the base insulation 110 and/or any sublayer may be formed with a concentricity less than or equal to approximately 1.1, 1.2, 1.3, 1.4, 1.5, or any other suitable value. Additionally, regardless of the number of sublayers incorporated into the base insulation 110, the base insulation 110 may have any desired overall thickness. As desired, the base insulation 110 may be formed from one or more layers that have any number of desirable properties, such as desired PDIV, dielectric strength, dielectric constant, and/or thermal rating values. For example, the base insulation 110 may have a thermal rating of 180° C., 200° C., 220° C., 240° C., or higher.

With continued reference to FIGS. 1 and 2A-2E, according to an aspect of the disclosure, one or more conformal layers may be formed as outermost layers of a magnet wire. For example, with reference to FIG. 1, one or more layers 115A, 115B containing parylene may be formed around the conductor 105. As desired, the conformal layer(s) may be formed on a conductor or on base insulation. Additionally, an adhesion promotor may optionally be applied to an underlying layer (e.g., a conductor, base insulation, etc.) prior to the formation of a conformal layer. In certain embodiments, a single conformal layer may be formed. In other embodiments, two or more conformal layers may be formed. Each conformal coating (generally referred to as coating 115) may consist of a relatively thin polymeric film that conforms to the contours of an underlying winding or magnet wire, article formed from a magnet wire, or an appliance incorporating a magnet wire. Additionally, a conformal coating 115 may be applied utilizing a wide variety of techniques. For example, a conformal coating 115 may be applied via one or more suitable chemical vapor deposition techniques. In other embodiments, a conformal coating 115 may be applied via brushing, dipping, spraying, and/or other suitable methods. Certain embodiments of the disclosure described herein discuss conformal coatings that include parylene. However, other suitable materials and/or combinations of materials may be utilized to form and/or incorporated into conformal coatings. Examples of suitable materials include, but are not limited to, one or more acrylic materials, one or more epoxy materials, polyurethane, silicones, polyimides, fluoropolymers, etc.

In the event that a conformal coating 115 includes a parylene material, a wide variety of different types of parylene may be utilized as desired in various embodiments of the disclosure. In general, a parylene material is a poly(p-xylylene) polymer that may be formed from a suitable dimer (e.g., cyclophane dimers, etc.). Examples of parylene (with example Chemical Abstracts Service or "CAS" identifiers) include, but are not limited to, parylene N (e.g., CAS 25722-33-2 formed from dimer 1633-22-3), parylene C (e.g., CAS 9052-19-2 formed from dimer 10366-05-9, CAS 28804-46-8, etc.), parylene D (e.g., CAS 52261-45-7 formed from dimer 30501-29-2), parylene HT or parylene AF-4 (e.g., CAS 3345-29-7 formed from dimer 3345-29-7, etc.), parylene F (e.g., CAS 1785-64-4 formed from dimer 1785-64-4), parylene A, parylene AM, parylene H, parylene SR, parylene HR, parylene NR, parylene CF, and/or parylene SF. In certain embodiments, the parylene materials utilized may be commercially available products manufactured and marketed by Specialty Coating Systems, Inc., which is based in Indianapolis, Ind. In other embodiments, the parylene materials may be commercially available products manufactured and marketed by KISCO Conformal Coatings, LLC, which is a multinational company headquartered in Japan. Specialty Coating Systems offers parylene N, parylene C, parylene D, and parylene HT products. Parylene N, also referred to as poly(para-xylylene), is a completely linear, highly crystalline material. Parylene C may be produced from the same raw material (e.g., dimer) as parylene N, modified by the substitution of a chlorine atom for one of the aromatic hydrogens. Parylene D may also be produced from the same raw material as parylene N, modified by the substitution of chlorine atoms for two of the aromatic hydrogens. In parylene HT and/or parylene AF-4, the 4 alpha hydrogen atoms of the parylene N dimer may be replaced with fluorine. Parylene HT may be particularly useful in high temperature applications (e.g., applications with short term temperatures up to 450° C.) and/or applications in which relatively long-term UV stability is required. Additionally, parylene HT may have the lowest coefficient of friction and dielectric constant of the described variants. In parylene F, fluorine may be included on a ring. Other types and/or variants of parylene may be utilized as desired. A few of the properties of several different parylene variants are illustrated in Table 1 below:

KISCO offers parylene products in several different varieties, including parylene C, parylene D, parylene N, parylene A, parylene AM, parylene H, parylene SR, parylene HR, parylene NR, parylene CF, and/or parylene SF. Any of these different materials may be utilized in various embodiments of the disclosure.

In certain embodiments, a plurality of layers 115A, 115B containing parylene may be utilized. As desired, a plurality of parylene-containing layers may be formed as the sole insulation on a conductor or, alternatively, a plurality of parylene-containing layers may be utilized in conjunction with one or more other insulating layers (e.g., enamel layer(s), extruded thermoplastic layers, etc.). For example, a plurality of parylene-containing layers 115A, 115B may be formed over base insulation 110. Additionally, in certain embodiments, a first parylene-containing layer 115A may include a first parylene material while a second parylene-containing layer 115B includes a second parylene material different than the first parylene material. For example, the first parylene-containing layer 115A may include one of the parylene materials (or a first combination of materials) described above while the second parylene-containing layer 115A includes a different one of the parylene materials (or a different combination of materials) described above. In other embodiments, more than two layers of parylene may be utilized.

In certain embodiments, a second parylene layer 115B may be formed directly on the first parylene layer 115A. For example, a layer of parylene N or parylene C may be overcoated with a layer of parylene HT or parylene AF-4. In other embodiments, one or more intervening layers may be positioned between the two layers of parylene. For example, an adhesive layer or layer containing one or more adhesion promotors may be positioned between the two layers 115A, 115B containing parylene. FIG. 2A illustrates an example magnet wire that includes an intervening layer 205 positioned between the two parylene layers 204, 206. A wide

TABLE 1

Parylene Properties

| | Parylene N | Parylene C | Parylene D | Parylene HT |
|---|---|---|---|---|
| Melting Point (° C.) | 420 | 290 | 380 | >500 |
| Continuous Service Temperature (° C.) | 60 | 80 | 100 | 350 |
| Short-term Service Temperature (° C.) | 80 | 100 | 120 | 450 |
| Linear Coefficient of Thermal Expansion at 25° C. (ppm) | 69 | 35 | 38 | 36 |
| Thermal Conductivity at 25° C. (W/(m · K)) | 0.126 | 0.084 | | 0.096 |
| Young's Modulus (psi) | 350,000 | 400,000 | 380,000 | 370,000 |
| Tensile Strength (psi) | 7,000 | 10,000 | 11,000 | 7,500 |
| Yield Strength (psi) | 6,100 | 8,000 | 9,000 | 5,000 |
| Elongation to Break (%) | Up to 250 | Up to 200 | Up to 200 | Up to 200 |
| Yield Elongation (%) | 2.5 | 2.9 | 3.0 | 2.0 |
| Density (g/cm$^3$) | 1.10-1.12 | 1.289 | 1.418 | 1.32 |
| Index of Refraction ($n_D^{23}$) | 1.661 | 1.639 | 1.669 | 1.559 |
| Water Absorption (% after 24 hrs) | Less than 0.1 | Less than 0.1 | Less than 0.1 | Less than 0.01 |
| Rockwell Hardness | R85 | R80 | R80 | R122 |
| Static Coefficient of Friction | 0.25 | 0.29 | 0.33 | 0.15 |
| Dynamic Coefficient of Friction | 0.25 | 0.29 | 0.31 | 0.13 |
| Dielectric Constant-60 Hz | 2.65 | 3.15 | | 2.21 |
| Dielectric Constant-1 KHz | 2.65 | 3.10 | | 2.20 |
| Dielectric Constant-1 MHz | 2.65 | 2.95 | | 2.17 | variety of suitable adhesion promotors and/or coupling agents may be utilized as desired in various embodiments including, but not limited to, materials that contain silane, organosilane, chlor silanes, methoxy silanes, ethoxy silanes, amino silanes, secondary amino silanes, oligomeric diamino silanes, etc. For example, an A-174 silane material (CAS 2530-85-0) or a similar material may be utilized. A few non-limiting examples of commercially available adhesion promoters include: Dynasylan® AMEO, Dynasylan® 1146, Dynasylan® 1124, TEGO® VariPlus, and TEGO AddBond manufactured and sold by the Evonik Degussa Corporation; BYK-4510 manufactured and sold by Altana AG; AdPro Plus and AdPro Poly manufactured and sold by Specialty Coating Systems. Inc., etc.

In certain embodiments, an adhesion promoter may be based on a silane material having hydrolysable groups on one end of the molecules and reactive nonhydrolyzable groups on the other end of the molecules. The hydrolysable groups may react with moisture to yield silanol groups, which in turn may react with or adsorb inorganic surfaces to enable strong bonds. The nonhydrolyzable groups may be compatible with resin formulations.

A parylene layer 115 may be formed with a wide variety of suitable thicknesses. In various embodiments, a parylene layer 115 may have a thickness as thin as approximately several hundred angstroms to as thick as approximately 75 µm. In certain embodiments, a parylene layer 115 may be formed with a thickness between approximately one micron (1 µm) and approximately 40 µm. In various embodiments, a parylene layer may have a thickness of approximately 0.5 µm, approximately 1 µm, approximately 2 µm, approximately 3 µm, approximately 4 µm, approximately 5 µm, approximately 6 µm, approximately 7 µm, approximately 8 µm, approximately 9 µm, approximately 10 µm, approximately 11 µm, approximately 12 µm, approximately 13 µm, approximately 14 µm, approximately 15 µm, approximately 20 µm, approximately 25 µm, approximately 30 µm, approximately 35 µm, approximately 40 µm, approximately 50 µm, approximately 60 µm, any value included in a range between two of the above values, or any value included in a range bounded on either a minimum or maximum end by one of the above values. Further, the thickness of a parylene layer 115 may refer to the thickness on one surface of a magnet wire or other coated article. With a parylene layer 115 formed around a magnet wire, the total "build" of the parylene will be approximately two times that of the thickness at a surface. Additionally, in certain embodiments, a plurality of parylene layers may be formed with substantially similar or approximately equal thicknesses. In other embodiments, at least two parylene layers may be formed with different thicknesses.

A wide variety of suitable methods and/or techniques may be utilized as desired in order to form a parylene-containing layer 115. For example, parylene may be applied via a vacuum deposition process. As no stable liquid phase of parylene has been isolated, parylene may be applied in its vapor or gaseous state via a deposition process. Accordingly, parylene does not suffer from any fluid effects that can cause pooling, flowing, bridging, meniscus, and/or edge-effect flaws. Parylene may also be relatively free of solvents, catalysts, and/or plasticizers. In one example embodiments, a solid dimer of a parylene material may be vaporized. A quantitative cleavage or pyrolysis of the dimer vapor at the two methylene-methylene bonds may be performed in order to yield a stable monomeric vapor. The monomeric vapor may then be provided into a deposition chamber where it polymerizes on a magnet wire, preformed magnet wire article, or appliance incorporating magnet wire. In certain embodiments, the parylene may be permitted to polymerize at approximately room temperature. A desired thickness of parylene may be obtained based on an amount of time that the magnet wire 100 or other substrate remains in the chamber. The parylene will deposit and/or polymerize in a conformal manner.

As desired in various embodiments, one or more parylene-containing layers 115A, 115B may be formed at a wide variety of different steps during the manufacture of magnet wire 100 or the incorporation of magnet wire into an appliance. In certain embodiments, one or more parylene-containing layers 115A, 115B may be formed around a magnet wire, such as magnet wire 100. The magnet wire 100 may then be provided downstream for further processing. In other embodiments, one or more parylene-containing layers 115A, 115B may be applied to a preformed winding wire or magnet wire article, such as a preformed coil of wire, a preformed hairpin, a waveform, or other section of shaped wire. For example, a magnet wire 100 may be formed into hairpins (e.g., approximately U-shaped hairpins, hairpins having relatively sharp or unsmooth bends, hairpins having bends of approximately ninety degrees or more, etc.) or other desired shapes prior to incorporation into a rotating electric machine (e.g., motor, generator, starter, alternator, et.). During the forming and/or processing of the magnet wire 100, the wire 100 may be cut and/or bent, thereby resulting in insulation faults and/or exposed portions of the conductor. In certain embodiments, the application of one or more parylene layers may be conducted in a batch process. For example, one or more preformed magnet wire articles may be formed, and at least one parylene coating may be formed on the articles prior to the articles being inserted into rotating electric machines or other appliances. The application of one or more parylene layers may result in a conformal coating that reduces and/or eliminates insulation faults, thereby improving electrical performance. The parylene layer(s) may also provide for resistance to various oils and/or chemical substances.

In yet other embodiments, magnet wire 100 and/or magnet wire articles (e.g., preformed hairpins, etc.) may be incorporated into an electrical appliance. Examples of suitable electrical appliances include, but are not limited to, motors, generators, alternators, starter-generators, rotating electric machines, etc. For example, magnet wire hairpins may be inserted into associated slots within an appliance. Once inserted or otherwise incorporated, one or more layers containing parylene may be formed on the appliance or assembly. The parylene-containing layer(s) may function as an overcoat or varnish that improves electrical performance. For example, the parylene-containing layer(s) may reduce insulation faults and/or exposed conductor portions. The conformal coatings may assist in insulating the magnet wire 100 or magnet wire articles from contaminants. In certain embodiments, the parylene-containing layers may additionally assist in securing the magnet wire and/or magnet wire articles within the appliances (e.g., within motor slots, etc.). Further, in certain embodiments, the application of one or more parylene-containing layers may eliminate the conventional step or process of applying a relatively messy varnish to the appliance. The elimination of this varnish application may reduce the amount of energy required in appliance assembly. Additionally, the elimination of the varnish application may reduce the use of relatively volatile chemicals that may pose environmental and health risks.

In certain embodiments, magnet wire 100, magnet wire articles, appliances, and/or other substrates (e.g., a conductor, base insulation, etc.) on which one or more parylene-containing layers are formed may be treated with one or more suitable adhesion promoting agents prior to the formation of one or more parylene-containing layers. A wide variety of suitable adhesion promotors may be utilized as desired in various embodiments, such as any of the example adhesion promotors discussed above.

As a result of forming one or more parylene-containing layers 115A, 115B on magnet wire 100, magnet wire articles, and/or appliances containing magnet wire, a conformal and/or insoluble coating may be formed that eliminates and/or reduces defects, faults, voids, pinholes, and/or exposed portions of the conductor 105. The reduction and/or elimination of pinholes and/or other defects may improve the electrical performance and/or life cycle of the magnet wire 100. Additionally, the parylene layer(s) 115A, 115B may promote resistance of oxidation, humidity, chemicals, oils (e.g., transmission fluid, etc.), and/or ultraviolet ("UV") light. Parylene may also provide a lower coefficient of friction, thereby allowing a magnet wire 100 to be more readily incorporated into an appliance. For example, as a winding or coil is formed, the lower coefficient of friction may reduce the chances of a first turn catching on a second turn and thereby damaging the insulation. In certain embodiments, magnet wire 100 incorporating one or more parylene layers 115A, 115B may be hydrolytically stable and resistant to oils and/or liquids, such as transmission fluid. The parylene layer(s) 115A, 115B may protect base insulation 110 and/or the conductor 105, thereby permitting the magnet wire to be directly in contact with or submerged in oil, automatic transmission fluid, and/or similar lubricants or fluids.

Certain types of magnet wire may have relatively large diameters, cross-sectional areas, or gauges in order to achieve a desired electrical appliance output. For example, round magnet wire larger than approximately 18 AWG (or other cross-sectional shapes of wire having a cross-sectional area larger than an 18 AWG equivalent may be formed with relatively thick insulation in order to attain desired electrical performance (e.g., PDIV, breakdown voltage, etc.). In certain embodiments, the use of one or more parylene layers 115A, 115B may result in increased electrical performance (e.g., improved PDIV, improved thermal and/or high temperature performance, etc.) and/or other improved performance (e.g., reduced coefficient of friction, etc.). In other embodiments, the use of one or more parylene layers 115A, 115B may permit a desired electrical performance to be attained while simultaneously reducing the thickness of the base insulation 110. As a result, the overall thickness of the magnet wire 100 may be reduced, thereby permitting higher packing of the magnet wire 100 within an appliance (e.g., a rotating electric machine, etc.). This higher packing may result in improved output.

As a result of utilizing one, two or more parylene layers 115A, 115B, in certain embodiments, it may be possible to enhance a wide variety of desirable magnet wire characteristics, for example, heat shock, coefficient of friction, thermal performance, chemical resistance, PDIV, dielectric strength, etc. Additionally, given the costs of various parylene materials, the use of two different parylene layers 115A, 115B may permit the formation of a desired insulation structure while reducing overall cost. For example, a less expensive parylene material may be utilized as an interior layer while a more expensive parylene material is utilized as an outer layer. In certain embodiments, a first layer (e.g., an interior layer, etc.) formed from a less expensive material may have a first thickness that is greater than a second thickness of a second layer (e.g., an outer layer). Additionally, in various embodiments, a relatively more expensive outer layer may have a lower dielectric constant, lower coefficient of friction, and/or any other improved properties relative to an inner layer. As desired, an outer layer may also provide improved oxidation protection for a conductor and/or any underlying layers. In certain embodiments, an inner layer may include a parylene material that deposits or forms more quickly than that of an outer or second layer. Accordingly, protective insulation may be formed more quickly on an underlying conductor or article.

A magnet wire 100 incorporating one or more parylene layers 115A, 115B may be engineered to have a wide variety of suitable electrical performance properties, such as any suitable dielectric strengths, PDIVs, and/or thermal ratings. In certain embodiments, a layer of parylene may have a dielectric strength in excess of approximately 7,000 volts/mil. In certain embodiments, a magnet wire 100 that incorporates one or more parylene layers 115A, 115B (i.e., a wire 100 with parylene layers formed over base insulation, etc.) may have a dielectric strength greater than approximately 10,000, 11,000, 12,000, 13,000, 14,000, 15,000 volts, or higher. Additionally, a magnet wire 100 incorporating one or more parylene layers 115A, 115B may have a PDIV greater than a desired threshold value, such as approximately 1,000, 1,300, 1,500, 1,700, 2,000, 2,500 volts, or higher. A magnet wire incorporating one or more parylene layers 115A, 115B may also be engineered to have a wide variety of thermal ratings, such as a thermal rating that permits relatively continuous (e.g., a time period such as 1,000, 5,000, or 20,000 hours, etc.) use at temperatures up to approximately 200° C., 220° C., 240° C., or higher without degradation of the insulation.

A magnet wire 100 or magnet wire article formed in accordance with embodiments of the disclosure may be suitable for a wide variety of applications. For example, the magnet wire may be suitable for use in automobile motors, starter generators for hybrid electric vehicles and/or electric vehicles, alternators, etc. As desired, the insulation system may permit the magnet wire 100 to satisfy relatively stringent electrical performance characteristics (e.g., dielectric strength requirements, PDIV requirements, etc.) while being sufficiently thin to allow a relatively tight packing or coiling of the magnet wire 100. As a result, the performance and/or output of an electrical machine or appliance formed using the magnet wire 100 (e.g., a rotary electrical machine, etc.) may be enhanced relative to machines formed utilizing conventional magnet wire.

The magnet wire 100 described above with reference to FIG. 1 is provided by way of example only. A wide variety of alternatives could be made to the illustrated magnet wire 100 as desired in various embodiments and as discussed with reference to FIGS. 2A-2E. For example, a base layer 110 may be formed with any number of sublayers. As another example, the cross-sectional shape of the magnet wire 100 and/or one or more insulation layers may be altered. Indeed, the present disclosure envisions a wide variety of suitable magnet wire constructions. These constructions may include insulation systems with any number of layers and/or sublayers.

As set forth above, a magnet wire and/or various insulation layers of a magnet wire may be formed with a wide variety of suitable cross-sectional shapes. FIGS. 3A-3F illustrate example cross-sectional shapes that may be utilized for magnet wire in accordance with various illustrative embodiments of the disclosure. Although the shapes in FIGS. 3A-3F are illustrated as conductor shapes, it will be appreciated that similar shapes and/or outer peripheries may be utilized for various insulation layers.

Figure 3A:
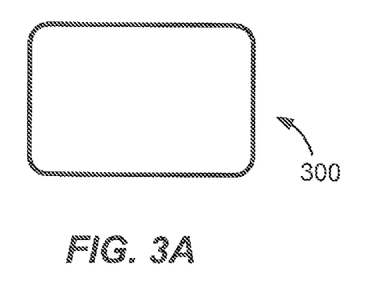
FIGS. 3A-3F illustrate example cross-sectional shapes that may be utilized for magnet wire in accordance with various illustrative embodiments of the disclosure.
Figure 3B:
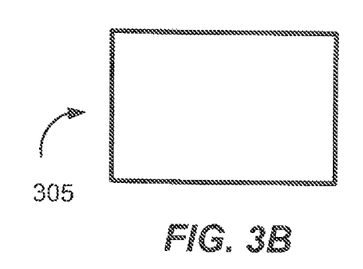
Figure 3C:
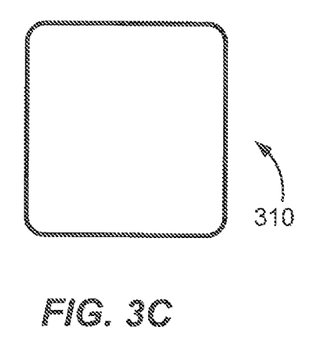
Figure 3D:
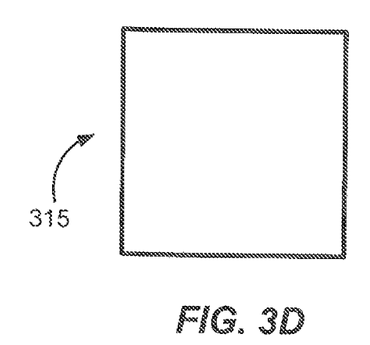
Figure 3E:
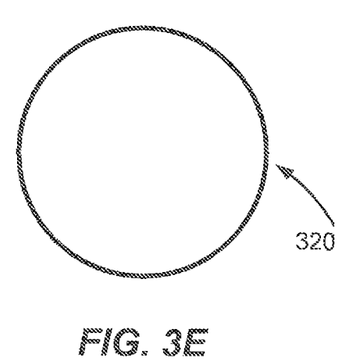
Figure 3F:
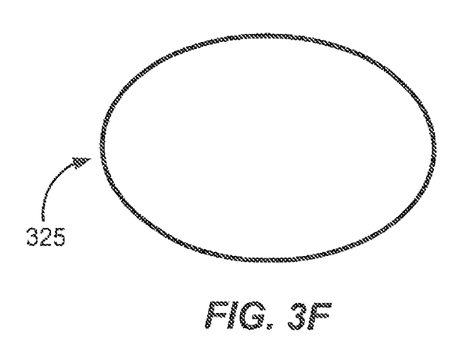

Turning first to FIG. 3A, a first example magnet wire 300 is illustrated as having an approximately rectangular cross-sectional shape. As shown, the corners of the magnet wire 300 may be rounded, blunted, or truncated. FIG. 3B illustrates a second example magnet wire 305 having a rectangular or approximately rectangular cross-section with relatively sharp corners. FIG. 3C illustrates a third example magnet wire 310 having an approximately square cross-sectional shape with rounded corners. FIG. 3D illustrates a fourth example magnet wire 315 having a square or approximately square cross-sectional shape with relatively sharp corners. FIG. 3E illustrates a fifth example magnet wire 320 having a circular cross-sectional shape, and FIG. 3F illustrates a sixth example magnet wire 325 having an elliptical or oval cross-sectional shape. Other cross-sectional shapes may be utilized as desired, and the shapes illustrated in FIGS. 3A-3F are provided by way of non-limiting example only.

Figure 4:
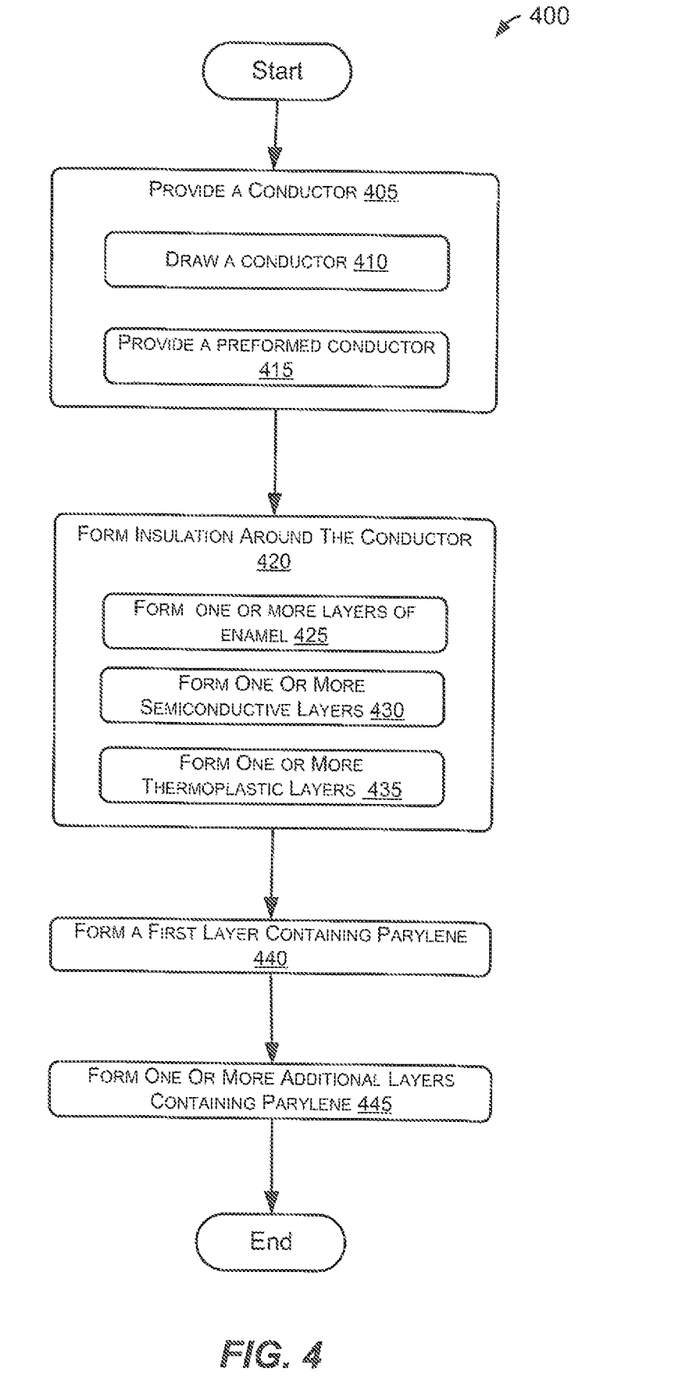
FIG. 4 illustrates a flow chart of an example method for forming magnet wire that includes one or more conformal layers in accordance with an illustrative embodiment of the disclosure.

FIG. 4 illustrates a flow chart of an example method 400 for forming magnet wire that includes at one or more conformal layers, such as one or more layers containing parylene, in accordance with an illustrative embodiment of the disclosure. The method 400 may begin at block 405. At block 405, a magnet wire conductor may be provided in accordance with a wide variety of suitable techniques and/or utilizing a wide variety of suitable wire formation systems. For example, at block 410, a conductor may be drawn from a suitable input material (e.g., a larger diameter conductor, rod stock, etc.). In certain embodiments, a wire forming device may include one or more dies through which the input material is drawn in order to reduce the size of the input material to desired dimensions. Additionally, in certain embodiments, one or more flatteners and/or rollers may be used to modify the cross-sectional shape of the input material before and/or after drawing the input material through any of the dies. For example, rollers may be used to flatten one or more sides of input material in order to form a rectangular or square wire. In other embodiments, a wire forming device may receive input material from a suitable continuous extrusion or conform machine. For example, a conform machine may receive rod stock (or other suitable input material) from a payoff or other source, and the conform machine may process and/or manipulate the rod stock to produce a desired conductor via extrusion. As another example, at block 415, a preformed conductor may be provided or received from a suitable payoff or source. In other words, a conductor may be preformed in an offline process or obtained from a supplier.

At block 420, which may be optional in certain embodiments, base insulation may be formed around the conductor. A wide variety of different types of base insulation may be formed around the conductor as desired in various embodiments. For example, at block 425, one or more layers of enamel may be formed around the conductor. In certain embodiments, the conductor may be passed through one or more suitable dies or other components that apply a varnish to the conductor, and the conductor may then be passed through an enameling oven in order to cure the varnish and/or evaporate solvents. In this regard, an enamel layer may be formed. The process may be repeated as desired in order to attain a desired enamel thickness and/or build. As another example, at block 430, one or more semi-conductive layers may be formed around the conductor. In various embodiments, a semi-conductive layer may be formed on the conductor in a similar manner to an enamel layer or a semi-conductive layer may be extruded onto the conductor. As yet another example of forming base insulation, at block 430, one or more layers of extruded thermoplastic material may be formed around the conductor. Any number of suitable devices may be configured to form an extruded layer, such as any number of suitable extrusion heads and/or other devices configured to apply a desired amount of thermoplastic insulation. As desired, the flow rates of the extruded insulation may be controlled in order to obtain a desired thickness. Additionally, in certain embodiments, one or more extrusion dies may be utilized to control the thickness and/or shape of the extruded insulation. In certain embodiments, base insulation may include a combination of different types of materials and/or layers. For example, enamel may be formed over a semi-conductive layer. As another example, an extruded layer may be formed over one or more underlying layers. Indeed, a wide variety of suitable base insulation structures may be utilized in accordance with various embodiments of the disclosure.

At block 440, a first conformal layer, such as a layer containing parylene, may be formed around the conductor and, if present, any base insulation. As set forth above, a wide variety of different types of materials may be formed, for example, parylene N, parylene C, parylene D, parylene HT, or other parylene variant. Additionally, a wide variety of suitable methods, techniques, and/or devices may be utilized to apply a parylene-containing layer. For example, the magnet wire may be positioned within a chamber in which vaporized parylene is permitted to form on an outer surface. As desired, the magnet wire may be arranged in the chamber such that substantial an entire outer surface of the magnet wire is exposed to the parylene. Further, in certain embodiments, the magnet wire may be vibrated or otherwise manipulated such that all portions of the outer surface are coated. As desired, the parylene-containing layer may be formed with any desirable or suitable thickness, such as a thickness between approximately one pun and approximately 40 μm.

At block 445, one or more additional conformal layers, such as one or more additional parylene-containing layers, may optionally be formed on the magnet wire. In other words, the layer formed at block 440 may be a first layer containing a first parylene material. At block 445, a second layer containing a second parylene material may be formed. As desired, a third layer, fourth layer, and/or any other number of layers may be formed in a similar manner. Additionally, in certain embodiments, at least two of the layers may include different parylene materials. For example, the second layer may contain a second parylene material different than the first parylene material. Each additional parylene-containing layers may be formed in a similar manner as that described above with reference to block 440. Additionally, in certain embodiments, the same deposition chamber may be utilized to deposit or form a plurality of different parylene-containing layers. In other embodiments, a plurality of different chambers and/or other devices may be utilized to deposit different layers.

As desired, suitable adhesion promoters or adhesion promoting layers may be formed between two or more parylene-containing layers, between a parylene-containing layer and the base insulation, between a parylene-containing layer and the conductor, and/or between any other layers. The method may end following block 445.

Figure 5:
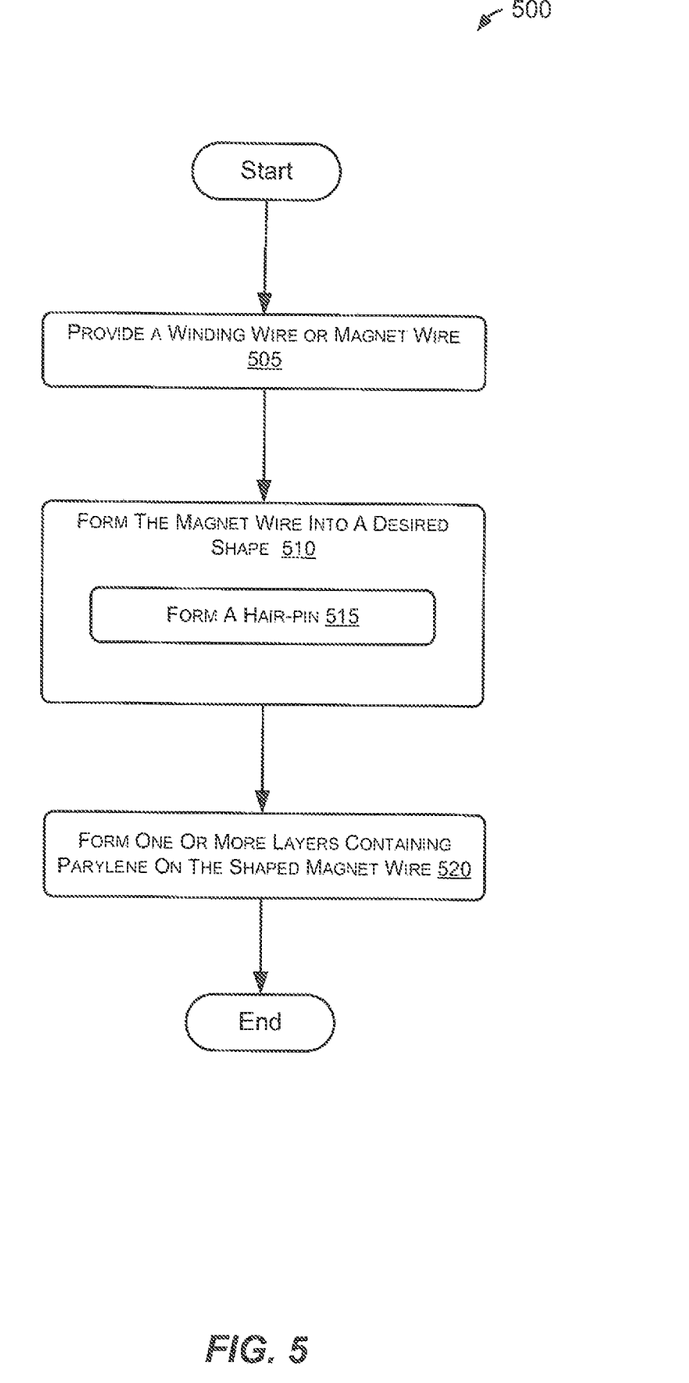
FIG. 5 illustrates a flow chart of an example method for forming a magnet wire article in accordance with an illustrative embodiment of the disclosure.

FIG. 5 illustrates a flow chart of an example method 500 for forming a magnet wire article in accordance with an illustrative embodiment of the disclosure. The method 500 may begin at block 505. At block 505, a winding wire or magnet wire may be provided. The magnet wire may include a conductor and an optional insulation system formed around the conductor. As desired, the insulation system may include a wide variety of suitable materials and/or layers including but not limited to, one or more semi-conductive layers, one or more enamel layers, one or more extruded layers, and/or one or more parylene layers. A few example magnet wire constructions are described in greater detail above.

At block 510, the magnet wire may be formed into a desired shape. In other words, the magnet wire may be formed into a suitable article that may be incorporated into an appliance, such as a rotating electric machine (e.g., an alternator, a motor, a generator, etc.). A wide variety of different articles and/or desired shapes may be formed as desired. In other embodiments, the conductor may be formed with a desired shape. For example, the conductor may be cast, printed (e.g., 3-D printed, etc.), produced with additive manufacture, or otherwise formed with a desired article shape. For example, at block 515, the magnet wire may be formed into one or more hairpins or other predetermined shapes for insertion into an appliance. In certain embodiments, the magnet wire may be cut into sections or portions, and each section may be bent into a hairpin or an article having at least one bend or twist. For example, a hairpin having a U-shaped bend may be formed. During assembly of an appliance, the hairpins may be arranged in proximity to one another, and connections (e.g., welded connections, etc.) may be formed as desired between the ends of various hairpins. The described hairpins are provided by way of example only, and it will be appreciated that a wide variety of other shapes, structures, and/or other articles may be formed from magnet wire.

Additionally, during the formation of an article, the magnet wire may be cut, twisted, bent, and/or otherwise manipulated. In some instances, the forces exerted on the magnet wire may result in the formation of faults, defects, and/or weakened areas within the magnet wire insulation. In some case, portions of the magnet wire conductor may be exposed (e.g., a portion where the magnet wire was cut, etc.). At block 525, one, two, or more parylene-containing layers may be formed on the one or more shaped magnet wire articles to provide conformal protective coatings. In certain embodiments, the coatings may be formed in a batch process prior to the articles being incorporated into an electrical appliance. Additionally, as set forth in greater detail above, a wide variety of suitable methods, techniques, devices, and/or other equipment may be utilized to form conformal layers. The method may end following block 525.

Figure 6:
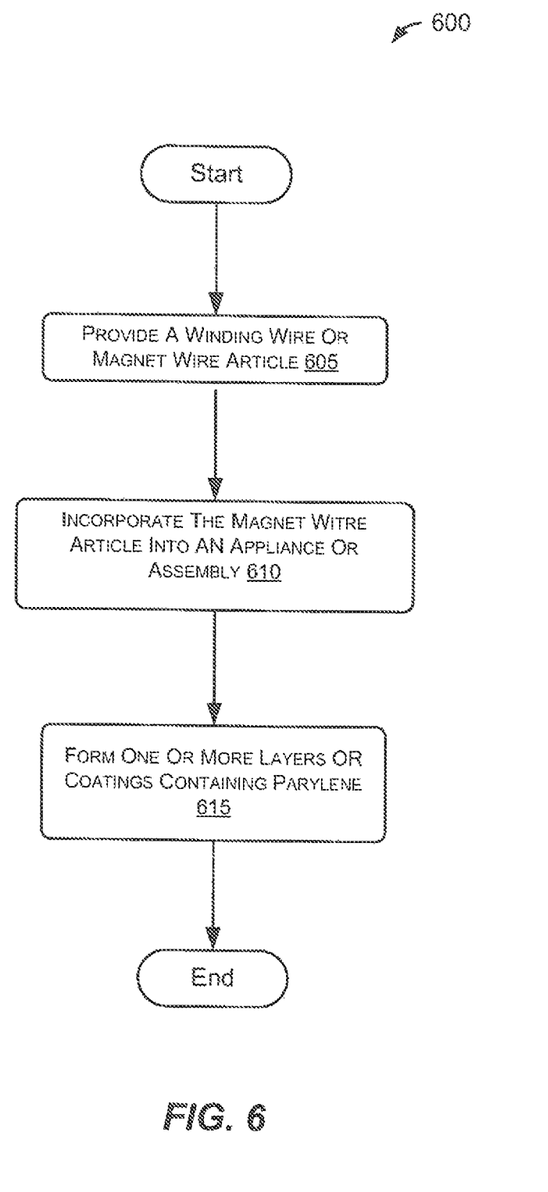
FIG. 6 illustrates a flow chart of an example method for forming an electric machine or other assembly in accordance with an illustrative embodiment of the disclosure.

FIG. 6 illustrates a flow chart of an example method 600 for forming an electric machine or other assembly in accordance with an illustrative embodiment of the disclosure. The method 600 may begin at block 605. At block 605, one or more winding wires, magnet wires, or magnet wire articles may be provided. For example, any number of preformed hairpins, and/or other articles may be provided as described in FIG. 5. At block 610, the magnet wire or article(s) may be incorporated into a suitable appliance or assembly. For example, magnet wire articles may be positioned within one or more associated slots (e.g., stator slots, etc.) or other portions configured to receive the articles. At block 615, conformal coatings, such as one, two, or more parylene-containing layers, may be formed on the appliance or assembly. The parylene-containing layers may provide protection for the magnet wire articles and/or may reduce or eliminate any faults and/or exposed conductor portions. Additionally, in certain embodiments, the parylene-containing layers may assist in holding or maintaining the magnet wire articles in place. As set above, a wide variety of suitable methods, techniques, devices, and/or other equipment may be utilized to form the parylene-containing layers. The method may end following block 615.

The operations described and shown in the methods 400, 500, 600 of FIGS. 4-6 may be carried out or performed in any suitable order as desired in various embodiments. Additionally, in certain embodiments, at least a portion of the operations may be carried out in parallel. Furthermore, in certain embodiments, less than or more than the operations described in FIGS. 4-6 may be performed.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An insulated winding wire comprising:
   a conductor; and
   insulation formed around the conductor, the insulation comprising:
   a first layer comprising a first parylene material; and
   a second layer comprising a second parylene material different from the first parylene material.

2. The insulated winding wire of claim 1, wherein the first parylene material comprises one of (i) parylene N, (ii) parylene C, (iii) parylene D, (iv) parylene HT, (v) parylene AF-4, (vi) parylene F, (vii) parylene A, (viii) parylene AM, (ix) parylene H, (x) parylene SR, (xi) parylene HR, (xii) parylene NR, (xiii) parylene CF, or (xiv) parylene SF.

3. The insulated winding wire of claim 1, wherein the second parylene material comprises one of (i) parylene N, (ii) parylene C, (iii) parylene D, (iv) parylene HT, (v) parylene AF-4, (vi) parylene F, (vii) parylene A, (viii) parylene AM, (ix) parylene H, (x) parylene SR, (xi) parylene HR, (xii) parylene NR, (xiii) parylene CF, or (xiv) parylene SF.

4. The insulated winding wire of claim 1, wherein the first parylene material comprises at least one of parylene N or parylene C and the second parylene material comprises at least one of parylene HT, parylene AF-4, parylene F.

5. The insulated winding wire of claim 1, wherein each of, the first layer and the second layer comprises a respective thickness between approximately 0.5 µm and approximately 60 µm.

6. The insulated winding wire of claim 1, further comprising an adhesion promoter positioned between the first layer and the second layer.

7. The insulated winding wire of claim 1, wherein the insulation further comprises at least one base layer formed between the conductor and the first layer comprising a first parylene material.

8. The insulated winding wire of claim 7, wherein the at least one base layer comprises at least one of (i) an enamel layer, (ii) an extruded thermoplastic layer, or (iii) a semi-conductive layer.

9. The insulated winding wire of claim 7, wherein the at least one base layer comprises at least one of (i) a polyimide enamel layer, (ii) a polyamideimide enamel layer, or (iii) a first enamel layer comprising polyimide and a second enamel layer comprising polyamideimide.

10. The insulated winding wire of claim 7, wherein the at least one base layer comprises an extruded thermoplastic layer, the extruded thermoplastic layer comprising at least one of (i) polyether-ether-ketone, (ii) polyaryletherketone, (iii) polyetheretherketoneketone, (iv) polyetherketoneketone, (V) polyetherketon (vi) polyetherketoneketoneetherketone, (vii) polyketone ("PK"), (viii) thermoplastic polyimide, (ix) aromatic polyamide, (x) aromatic polyester, or (xi) polyphenylene sulfide.

11. The insulated winding wire of claim 7, wherein the at least one base layer comprises:
one or more enamel layers; and
an extruded thermoplastic layer formed around the one or more enamel layers.

12. An insulated winding wire comprising:
a conductor;
base insulation formed around the conductor, the base insulation having a thermal rating of at least 180° C.; and
at least one layer comprising a parylene material formed around the base insulation.

13. The insulated winding wire of claim 12, wherein the first par material comprises one of (i) parylene N, (ii) parylene C, (iii) parylene D, (iv) parylene HT, (v) parylene AF-4, (vi) parylene F, (vii) parylene A, (viii) parylene AM, (ix) parylene H, (x) parylene SR, (xi) parylene HR, (xii) parylene NR, (xiii) parylene CF, or (xiv) parylene SF.

14. The insulated winding wire claim 12, wherein the at least one layer comprising a parylenc material comprises a plurality of parylene-containing layers, each the plurality of layers comprising a respective parylene material.

15. The insulated winding wire of claim 14, wherein a first of the plurality of parylene-containing layers comprises a first parylene material and a second of the plurality parylene-containing layers comprises a second parylene material different than the first parylene material.

16. The insulated winding wire of claim 14, wherein the first parylene material comprises at least one of parylene N or parylene C and the second parylene material comprises at least one of parylene HT, parylene AF-4, or parylene F.

17. The insulated winding wire of claim 15, further comprising an adhesion promoter positioned between the first and second parylene-containing layers.

18. The insulated winding wire of claim 12, wherein the base insulation comprises at least one of (i) an enamel layer, (ii) an extruded thermoplastic layer, or (iii) a semi-conductive layer.

19. The insulated winding wire of claim 12, wherein the base insulation comprises at least one of (i) a polyimide enamel layer, (ii) a polyamideimide enamel layer, or (iii) a first enamel layer comprising polyimide and a second enamel layer comprising polyamideimide.

20. The insulated winding wire of claim 12, wherein the base insulation comprises an extruded thermoplastic layer, the extruded thermoplastic layer comprising at least one of (i) polyether-ether-ketone, (ii) polyaryletherketone, polyetheretherketoneketone, (iv) polyetherketoneketone, (v) polyetherketone, (vi) polyetherketoneketoneetherketone, (vii) polyketone ("PK"), (viii) thermoplastic polyimide, (ix) aromatic polyamide, (x) aromatic polyester, or (xi) polyphenylene sulfide.

21. The insulated winding wire of claim 12, wherein the base insulation comprises:
one or more enamel layers; and
an extruded thermoplastic layer formed around the one or more enamel layers.

22. The insulated winding wire of claim 12, further comprising an adhesion promoter positioned between the base insulation and the at least one layer comprising a parylene material.

* * * * *